Sept. 9, 1969  GYULA TAKATSY  3,466,153
APPLIANCE FOR USE IN CHEMICAL ANALYSIS
Filed Aug. 12, 1966  2 Sheets-Sheet 2

INVENTOR:
Gyula Takatsy

BY Karl F. Ross

ATTORNEY

United States Patent Office 3,466,153
Patented Sept. 9, 1969

3,466,153
APPLIANCE FOR USE IN CHEMICAL ANALYSIS
Gyula Takatsy, Budapest, Hungary, assignor to Metrimpex Magyar Muszeripari Kulkereskedelmi Vallalat, Budapest, Hungary
Filed Aug. 12, 1966, Ser. No. 576,498
Int. Cl. B01l 3/00
U.S. Cl. 23—292          6 Claims

ABSTRACT OF THE DISCLOSURE

A cage for a volumetric liquid-transfer device, mounted on a shaft, comprises a grid of flat bars surrounding an axially positioned stem so as to form an annular capillary space between the stem and the inner surfaces of the bars, the mutual separation of the bars being greater than the maximum spacing which would enable capillary retention of entrained liquid between the bars.

---

This invention relates to an appliance for use in analyzing chemicals. The appliance is adapted to facilitate a rapid, accurate and efficient as well as hygienic determination of the composition of liquid chemicals or of the quantity of any substance contained therein.

In laboratory work the need to determine the quantity of a particular component in a complex liquid substance often arises. Generally such an analysis is performed by preparing dilutions of graduated concentration of the substance that is to be analyzed and by determining the lowest concentration in which the analyzed substance just produces a product that is clearly detectable e.g. by discoloration or precipitation, upon reacting with a particular selected reagent.

From this lowest concentration the quantity of the selected component, i.e. its concentration in the initial solution, is ascertained by calculation. This method is known as titration and is applied particularly to substances which are not amenable to any conventional precise analytical method of measurement.

In one known method of titration the graduated dilutions are prepared with the help of glass pipettes and burettes. The liquids are blown by mouth from the pipette into the burette or are sucked back in the same way.

Titration with the help of pipettes and burettes is a slow process. Since in some laboratories several thousand analyses are performed every day and the pipettes and burettes must be carefully and laboriously washed after each analysis, it is clear that the use of glass pipettes and glass burettes does not satisfy modern analytical requirements. Some of the pipettes and burettes cannot be re-used after they have been used for an analysis. Pipettes and burettes are expensive and the shelves required to keep them are also costly, besides taking up valuable space and being inconvenient.

Titrations with pipettes and burettes are not hygienic since blowing and sucking by mouth may easily cause harmful vapors and gases to be inhaled.

In other methods of testing by chromatographic and electrophoretic analyses, pipettes and burettes are not needed, but the analyses take time to perform and are applicable only to some materials.

For carrying out titrations, appliances have been proposed in which the burettes are replaced by rows of recesses in a plate. A predetermined volume of diluent is fed dropwise into every recess of a row. Capillary cages made of a coil of wire and having a given holding capacity are then dipped into the solution that is to be analyzed. The charged cage is then dipped into the diluent in the first recess and rotated about the axis of its shaft in order to mix the solution held in the cage with the diluent. When the cage is taken out of the mixture, it will have been charged with a volume of the mixture corresponding to the capacity of the cage; this mixture, which is now a dilution of the solution to be analyzed, is then dipped into the next recess of the row. The same manipulation described with reference to the first recess is repeated consecutively in each recess. An indicator is then introduced dropwise into each recess in succession and, by reference to the reactions which occur (discoloration, droplet formation and so forth) and the position of the hole in which the reaction is first detectable, the concentration of the selected substance in the initial solution can be determined.

With the aid of recesses in a plate and a capillary cage, as described, analyses can be quickly performed in a manner that is completely hygienic, but the reliability and economy of the procedure is not yet satisfactory. The reason for this resides in the particular construction of known types of capillary cage. Conventional cages (see my prior U.S. Patent No. 3,077,780) are composed of two wire coils fixed side by side and having a roughly spherical or ellipsoidal envelope surface. The liquid enters the interior of the coils because of the capillary action of the gaps between the coil convolutions. If these gaps become wider their capillary effect decreases and if the size of the gaps exceeds a maximum size some of the liquid held in the cage may leak out during the manipulations.

Although the capillary openings on the surface favor the filling of the inside of the cage with liquid, the powerful capillary forces also impede the release of the liquid as well as the desired rapid and complete liquid interchange.

After fabrication of the coils which are produced by bending the wire, considerable stresses remain in the wire which cannot be completely removed by annealing. In the course of time the coils change their shape and their capacity for holding a given volume of liquid changes accordingly. Their volumetric capacity then differs from that measured during production. When such capillary cages are used, the results obtained with their aid will be false.

Despite the greatest care and the selection of the most homogeneous material, the coils cannot be so made that in mass production cages having capacities within narrow limits of tolerance can be obtained. Even in ideal cases the best that can be achieved are capillary cages with capacity errors not exceeding $\pm 3\%$, but in practice the average error is found to be between $\pm 5\%$ and $\pm 8\%$ and this is not good enough for a reliable titration.

When the capillary cages are dipped into and rotated in the recess, the coil surface may bear on the bottom of the recesses. The coiled cages which consist of thin wire are thus often exposed to sufficient pressure to cause deformation and the coiled cages soon become useless.

It is advisable to clean the cages between consecutive analyses in a flame or to sterilize them. In the flame the coiled cages frequently lose their hardness to such an extent that they are easily permanently deformed, because the outsides of the turns of the coil are exposed to pressure when the cages are twisted in the solution. The coils are usually made of a wire material which may permit the capillary cages to oxidize if they are not properly tempered, and this may also cause trouble in subsequent analytical use.

The production of the coiled cages is a most troublesome and difficult process. Mass production is out of the question and such coiled capillary cages are therefore expensive. Calibration must likewise be done cage by cage on analytical scales and only correctly dimensioned cages are of any use.

It is the object of the present invention to provide an appliance for use in the analysis of chemicals, in the form of a capillary cage which can be mass produced cheaply with great precision and accuracy of shape and which will retain its dimensions and shape and hence its properties during use, even if subjected to cleaning by baking in a manner that deviates from the prescribed procedure.

According to the invention there is provided an appliance for use in chemical analysis comprising a shaft and a capillary cage mounted on the shaft, said cage comprising a centrally positioned stem and flat bars, at least a part of each of said bars being spaced from the stem and having a flat surface so dircted towards the stem that liquids will be entrained between the stem and said parts by capillary action; the mutual separation of these parts of adjacent bars is such that there will be no capillary action therebetween.

The stem in the interior of the cage is preferably coaxially disposed and extends from one end of the cage to the other, projecting from the cage at the end remote from the shaft which carries the cage.

According to another feature of the invention the cage portion comprises a body with a hemispherical end and a cylindrical slotted portion forming flat bars integral therewith, the bars being formed by drawing and bending a blank. A baseplate is attached to the cylindrical portion so as to close the bottom of the cage.

Another important feature of the invention is that the baseplate is gripped between a head on the carrier and a shoulder on the stem whereby the cage is secured to the shaft.

Specific embodiments of the improved liquid-transfer device according to my present invention will now be described by way of example with reference to the accompanying drawing in which.

Figure 1:
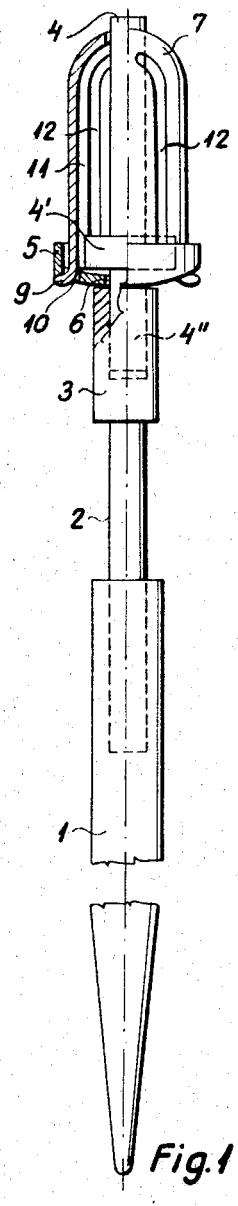
FIG. 1 is a partly sectional view of a capillary cage according to the present invention.

A pin-like extension 4" of a central stem 4 projecting beyond a shoulder 4' is firmly pressed into an axial bore provided in the head 3 of a carrier 2 attached to a handle or shaft 1. A baseplate 5 is provided with a central opening 6. The diameter of this opening 6 matches that of the extension 4" traversing same after having been thus mounted, the preferably slightly convex baseplate 5 is firmly gripped between the head 3 and the shoulder 4' in its assigned position.

Figure 3:
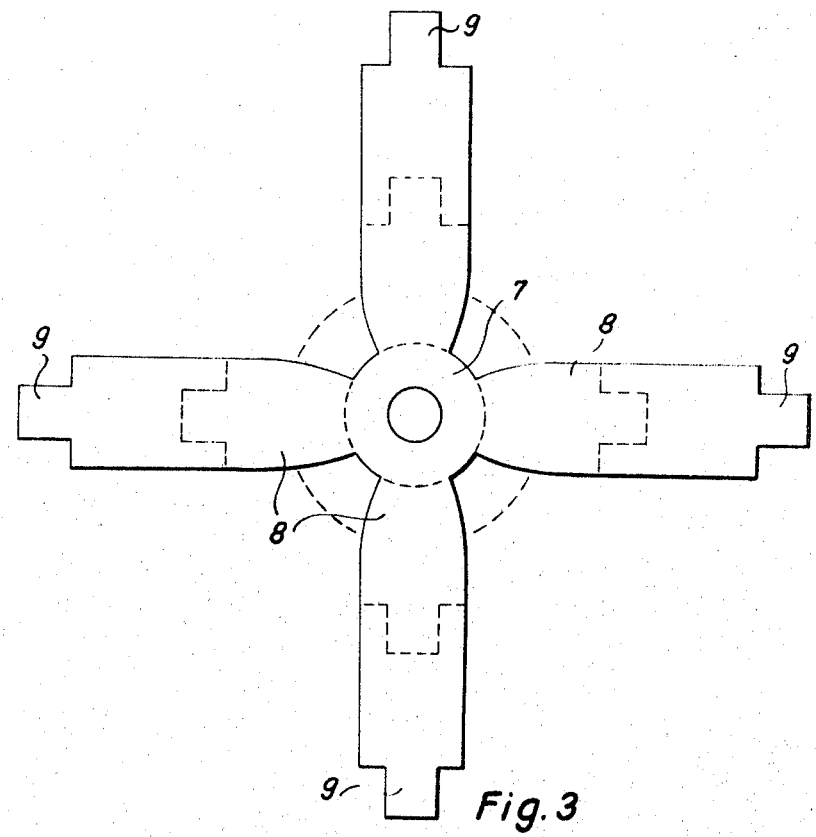
FIG. 3 is a face view of flattened cut-out blank from which the capillary cage is made.
Figure 4:
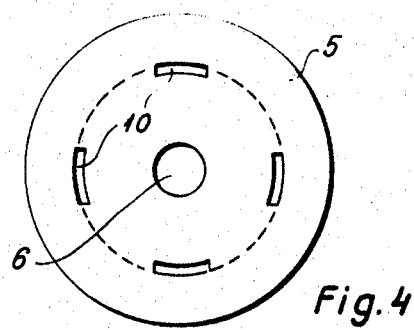
FIG. 4 is a bottom view of the baseplate of the capillary cage.

The dimensions of the blank used for forming the cage (FIG. 3) which is preferably stamped out of sheet metal or a like material on a punch press, are such that when the upper end 7 of the cage has been shaped in the die in the form of a hemispherical cap and the arms 8 have likewise been arched to define the bars of a cylindrical grid, the lug ends 9 are insertable into slits 10 (FIG. 4) in the baseplate 5 and can be secured by being bent over. Cap 7, originally formed as a ring from which the strips 8 radiate, has a center hole designed to receive the upper end of the stem 4 (FIG. 1) or 4a (FIG. 2). The result is the formation of a cage of predetermined size and holding capacity. The capacity of the cage (FIG. 1) formed from the blank shown in full lines in FIG. 3 is 0.050 milliliter, whereas the capacity of the cage (FIG. 2) formed from a blank having arms terminating as indicated in dashed lines in FIG. 3 is only 0.025 milliliter.

The length of the central stem 4a in FIG. 2 is so chosen as to conform to the height of the finished capillary cage.

Figure 2:
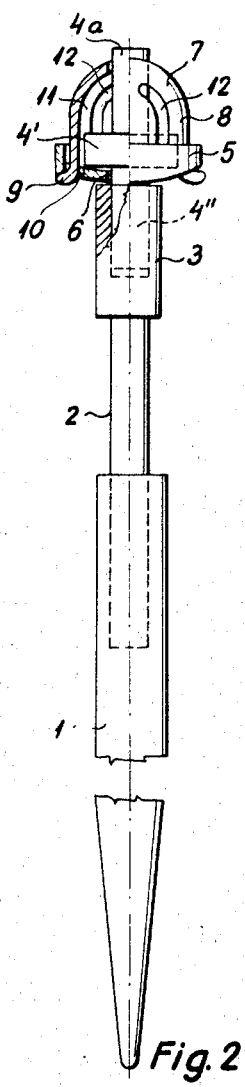
FIG. 2 is a partly sectional view of another embodiment of the capillary cage.

The central stems 4 and 4a preferably project a few tenths of a millimeter from the tops 7 of the two cages illustrated in FIGS. 1 and 2. An annular capillary space 11 is formed between the stems 4, 4a and the inner surface formed by the arms or bars 8, this gap safely retaining the liquid by capillary forces, whereas the gaps 12 between the several arms 8 are sufficiently wide to permit the liquid in the cage to be quickly discharged.

The advantages of my improved capillary cage are as follows:

The cage is cheap to make by mass-production methods. For making the blanks for the two above-mentioned capacities (FIG. 3) only two stamping tools and a single bending tool are required. The accuracy of the capacities of mass-produced capillary cages can be kept within tolerance limits of ±1%. Individual calibration can be dispensed with. No internal stresses that could give rise to subsequent deformation remain in the sheet metal which may be of a material, e.g. sheet platinum, capable of being heated without becoming oxidized. When the cages are rotated in the diluent they are separated by the projecting ends of the stems 4 and 4a from the floor of the recesses containing the diluent. The cages are therefore safe from deformation and last a long time.

The invention is not limited to the embodiments described by way of illustration. The scope of the invention is intended to include any forms of construction in which some elements (e.g. the head 3 or the joint between stem and baseplate) are modified but which fulfill the same functions and have equivalent effects.

What I claim is:

1. A liquid-transfer device comprising a cage with a substantially cylindrical grid of flat bars, a stem extending axially within said grid, and handle means supporting said cage; said bars having inner surfaces confronting said stem and defining therewith an annular capillary space narrow enough to retain entrained liquid therein, the mutual separation of said bars being larger than that enabling capillary retention of said liquid between adjacent bars.

2. A device as defined in claim 1 wherein said stem extends over the entire axial length of the cage.

3. A device as defined in claim 1 wherein said handle means comprises a shaft secured to said cage at one end thereof, said stem being supported on said shaft.

4. A device as defined in claim 3 wherein said cage is provided with a baseplate peripherally connected with said bars and provided with a central opening, said stem having an extension traversing said opening, said shaft being provided with a head having an axial bore receiving said extension with tight fit, said stem being formed with a shoulder clamping said baseplate between itself and said head.

5. A device as defined in claim 3 wherein the end of said cage remote from said shaft has the shape of a substantially hemispherical cap of sheet material, said bars being strips extending integrally from said cap.

6. A device as defined in claim 3, 4 or 5 wherein said stem projects axially beyond said cage at the end thereof opposite said one end.

References Cited

UNITED STATES PATENTS

| 3,077,780 | 2/1963 | Takatsy | 23—259 XR |
| 3,191,813 | 6/1965 | Duff | 23—292 XR |
| 3,252,331 | 5/1966 | Lancaster | 222—356 XR |

MORRIS O. WOLK, Primary Examiner

R. E. SERWIN, Assistant Examiner

U.S. Cl. X.R.

23—259; 73—425.4